March 1, 1960 J. A. BENSON ET AL 2,926,495
FUEL INJECTION NOZZLE
Filed Dec. 29, 1955
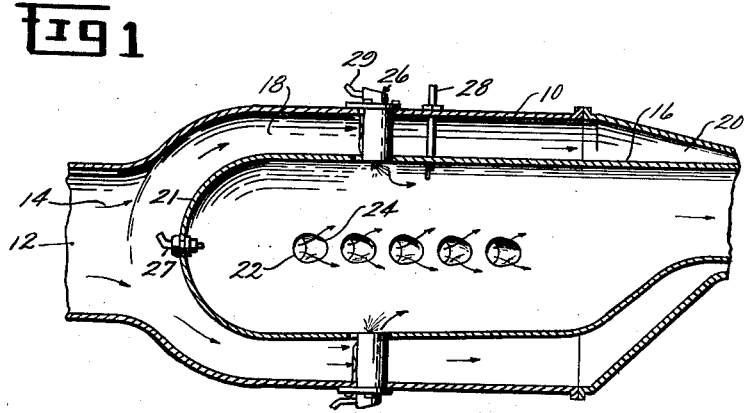
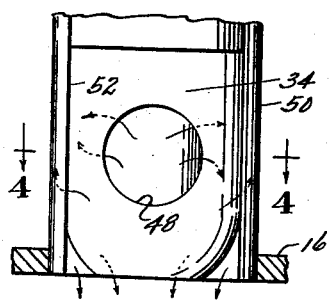
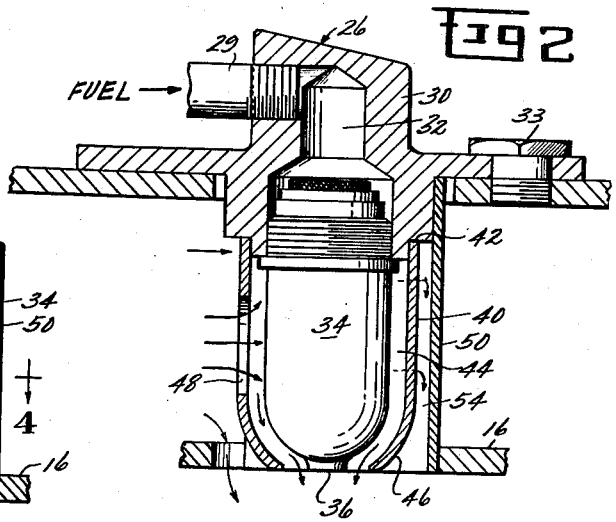
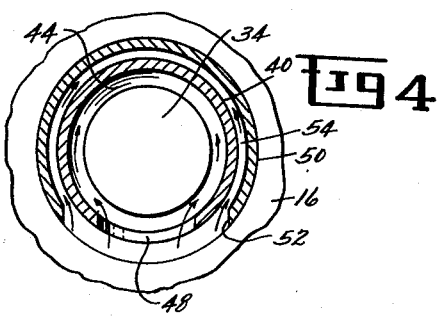
INVENTORS
JOHN A. BENSON
LOWELL J. PIERCE
BY
Maurice H. Klitzman
THEIR ATTORNEY United States Patent Office 2,926,495
Patented Mar. 1, 1960

2,926,495
FUEL INJECTION NOZZLE

John Albert Benson, Nahant, and Lowell Jackson Pierce, Melrose, Mass., assignors to General Electric Company, a corporation of New York Application December 29, 1955, Serial No. 556,126

1 Claim. (Cl. 60—39.74)

This invention relates to combustion apparatus and in particular to combustion apparatus for use with high energy fuel.

In general, for example, in turbofan, turbojet or turboprop engines, air is taken on board the engine and compressed by an axial flow compressor or the like. The compressed air is then mixed with fuel for the combustion process. The combustion gases then pass downstream through a turbine for driving a load such as a compressor or propeller. After the turbine has taken some energy out of the combustion gases, the gases pass downstream through an exhaust nozzle out to the atmosphere to produce thrust. The higher the temperature of the hot gases, the greater is the energy available for producing thrust and other power requirements of the engine. In other words, in order to provide as much energy to the air as possible, various types of high energy fuels are mixed with the air to increase the temperature of the hot gases as it passes through the turbine nozzles and turbine. In order to maintain this high temperature, special high energy fuels are now being developed which require less fuel to provide the necessary energy and heat to the compressed air during the combustion process. One of these more desirable high energy fuels are the boride fuels which are composed of boron and hydrogen. Since the boron has the ability to hold hydrogen atoms in combination, the result is the fuel has a high heating value as compared to other fuels used today. The boron fuel has more B.t.u. content than normal fuels so that it takes less fuel to attain the same turbine inlet temperature. The boron fuel also has the feature of being lighter than other fuels presently used today, and therefore, permits the carrying of larger quantities of fuel on board, resulting in larger ranges of flight.

Although these high energy fuels have the definite desirable characteristic, of providing the same turbine inlet temperature with less fuel, they also have a certain disadvantage. The disadvantage, being that the boron fuel is composed of boron and hydrogen and creates certain undesirable product formations. Although the hydrogen unites with oxygen to form heat and water, the boron unites with oxygen to form boron oxide, which is a glassy like crystalline form that sticks to the combustion liner wall and fuel injectors. This has been due to the fact that the fuel is injected in such a manner that burning takes place not only at the fuel injectors, but also along the combustion liners. Therefore, the boron oxide which is one of the products of combustion of the boron fuel, forms very readily and attaches itself to the wall of the combustion liner and to the fuel injector. It is therefore, a general object of this invention to prevent formation of combustion products on the fuel injector as well as the combustion liner of a combustion chamber when using high energy fuels for combustion purposes.

When using a high energy fuel, such as a boron fuel, for mixture with the compressed air, boron oxides result as a product of the combustion process. This product forms about the fuel injector and combustion liner so as to change the design configuration of the combustion liner and to obstruct the fuel injection opening in the fuel nozzle which prevents efficient fuel injection and ultimately clogs the opening of the fuel injecting nozzle.

It is therefore an object of this invention to provide a fuel injector assembly which prevents formations of oxides or the like about the fuel injector and combustion liner of a combustion system.

In high energy fuels, such as boron fuel, the temperature generated in the combustion chamber by the burning fuel is of such a high temperature that the heat conducted through to the fuel injector tends to decompose the fuel. Therefore, it is still another object of this invention to provide a means for shielding the fuel injector from the heat generated in the combustion chamber so as to prevent the decomposing of the high energy fuel.

High energy fuels, such as boron fuel, produce products which tend to settle at the fuel injector and the walls of the combustion liner because as the fuel burns, it forms eddies along the fuel nozzle and wall. Now, the eddies are accompanied by a sufficiently low velocity to allow the boron oxide to settle and become deposited on the liner walls and nozzle. It is therefore a still further object of this invention to provide a means for preventing eddies from forming near the fuel injector and combustion chamber walls so that products of the combustion process can't settle as a result of the low velocity eddies.

Briefly stated and in accordance with one aspect of this invention, means are provided in cooperation with a fuel nozzle for injecting high energy fuel into a combustion system for preventing the fuel from decomposing and the products of combustion from settling on the fuel nozzle and the walls of the liner.

These and other objects will become more apparent when read in the light of the accompanying drawing, wherein, the parts of the device are referred to specifically, but are intended to be applied as generically as the prior art will permit, wherein;

Figure 1 is a cross-sectional view of a combustion chamber used in connection with high energy fuels, Figure 2 is a cross-sectional view showing the fuel nozzle and shrouded construction, Figure 3 is a view looking downstream at a portion of the fuel nozzle, Figure 4 is a cross-sectional view of the fuel nozzle taken on lines 4—4 of Figure 3.

Referring to Figure 1, the cross-sectional view of the combustion chamber 10 is shown, which may be that of a turbojet, turboprop or turbofan or any type of energy producing system requiring a combustion chamber. The combustion chamber that is shown at 10 has an inlet 12 adapted to receive air or the like, as shown at 14. A liner 16 is shown supported in the combustion chamber 10. The walls defining the liner 16 and the walls defining the combustion chamber 10 are spaced so as to form an air passageway 18 therebetween and an exit 20. The dome 21 of the liner 16 may be eliminated in some applications. Air inlet openings are shown in the liner 16 at 22 which have struck out portions or the like 24 for directing the air passing downstream in the air passageway 18 into the center of the liner 16.

In order to support combustion in the liner 16, fuel is transmitted to the fuel injector generally shown at 26 for delivering the fuel into the center of the combustion liner 16 so as to mix with the air passing through the openings 22. In order to ignite this mixture of oxygen and fuel, an igniter or the like 28 is provided which can be in the form of a spark plug. If so desired normal fuel can be injected at 27 in addition to the high energy fuel. Also, the high energy fuel can be of the self igniting type, in which case the igniter would not be necessary.

Referring more specifically to Figure 2 and to the fuel injector 26, a fuel conduit is shown at 29 which is threadedly mounted in the fuel injection housing 30.

The fuel injector housing is provided with an opening 32 for the passage of fuel therethrough. This housing is supported on the combustion chamber 10 by any means such as by threaded bolts 33, or by welding if so desired. A fuel injector 34 is threadedly mounted in the opening 32 of the housing 30 or it can be welded to prevent leakage. The fuel injector 34 is necked down as shown at 36 and internally constructed in such a manner so as to form a nozzle to provide a restricted orifice in order to increase the pressure within the fuel injector 34, to thereby force the fuel to issue from the nozzle 36 in the form of a spray. The nozzle 36 can be so designed as to form different types of spray patterns, which is suitable for a specifically designed combustion apparatus. Since high energy fuels such as boron fuels, form deposits which settle on the liner and on the fuel injector, means are provided in combination with the fuel injector to prevent such formations. The means is formed by positioning a shroud 40 about the fuel injector 34, which shroud is adapted to sit on a shoulder or the like 42 on the injector housing 30. The shroud is slightly larger than the fuel injector 34 so as to form a passageway 44 for the passage of air about the fuel injector. The shroud is also necked down as shown at 46 so as to conform to the configuration of the necked down portion or fuel nozzle 36. This shroud is desirable so as to force the air coming into the passageway 44 through the opening 48 to sweep closely to the fuel injector 34. The air passing in this manner about the fuel injector 34 creates an aspirator effect so as to draw the fuel outwardly away from the fuel nozzle 36. However, even with this aspirator effect, the burning of the high temperature fuels, create eddies along the walls 16 from about the necked down portion 46 of the shroud 40. These eddies create low velocities permitting the boron oxide, or the like, formed by burning of the boron fuel, to settle on the necked downed portion 46 and the fuel nozzle 36, in addition to the walls of the liner 16. Further, the high temperatures generated in the combustion liners 16, is sufficient to conduct heat through the walls and tend to decompose the fuel passing through the fuel injector 34. In order to eliminate these problems an outer shroud or radiation shield 50 is provided. This radiation shield is C-shaped so as to provide an opening 52 in the form of a slot on the upstream side of the injector. The shield 50 is spaced from the shroud 40 in order to form a passageway 54 therebetween. Air passing through this passageway into the combustion liner 16 tends to also form an aspirator effect to blow the fuel toward the center of the combustion liner. The shield 50 acts as a radiation shield to decrease the radiation of heat from the liner 16 to prevent the fuel from decomposing in the fuel injector 34. The shield also destroys the formation of eddies accompanying just the single shroud 40. The prevention of the forming of eddies adjacent to the walls 16 and the nozzle 36 prevents the boron oxides from settling.

In operation, the compressed air or the like entering the inlet 12 passes downstream through the passageway 18. Normally, this air is scooped and directed through the openings 22 into the combustion chamber, where the air is mixed with fuel. The fuel is normally fed into the liner 16 from a source of fuel through conduit 29 and through the fuel injector 34. Normally the fuel injector has a nozzle 36 which is constructed to form a particular type of spray pattern adaptable for the design of the combustion liner so as to get the most efficient mixing. A portion of the air in the passageway 18 is directed into the passageway 44 through the opening 48 to sweep over the fuel injector 34 in order to operate as an aspirator. Although this air passing over the fuel injector 34 and the necked down nozzle portion 36 is under sufficient pressure so as to blow the fuel further out into the stream before it is burned, eddies are created during burning which caused the deposits of the products of combustion to settle due to its low velocity. Therefore, in order to break up the formation of the eddies which causes the low velocity, an outer shroud or shield 50 is used. The shield 50 picks up air passing down the passageway 18 through the slot 52 and directs it downwardly through the passageway 54 so as to sweep the inner shroud 40 tending to break up the formation of low velocity eddies formed between the wall 16 and the necked down portion 46 of the shroud 40. Breaking up of the eddies enables the air passing through the passageway 44 to blow the high energy fuel further out into the stream so that it cannot settle upon burning and become deposited on the nozzle 36 or the walls of the liner 16.

Therefore, a double shrouded fuel injector nozzle is provided in which the single shroud tends to prevent the formation of deposits thereon by creating an aspirator effect so as to blow the high energy fuel out into the stream, and the outer shroud is used to prevent the heat in the combustion liner 16 from being transmitted to the fuel injector nozzle thereby preventing fuel from decomposing, and also to prevent the formation of low velocity eddies which would permit the boron oxides or the like to form on the fuel nozzle and the walls of the combustion liner.

Although the invention has been described in connection with combustion systems of the turbo-type, it is intended that the shrouded nozzle can be used in any combustion system where the fuel used creates products which deposit on the combustion chamber walls. Also, although boron fuels were described as an illustration of high energy fuels creating the settling of deposits, other high energy fuels create the same problem, and it is intended that this invention be used with those fuels as well.

While a particular embodiment of the invention has been illustrated and described, it will be obvious to those skilled in the art that various changes and modifications may be made without departing from the invention and it is intended to cover in the appended claim all such changes and modifications that come within the true spirit and scope of the invention.

What we claim as new and desire to secure by Letters Patent of the United States is:

For use in a combustion chamber having a source of high energy fuel, such as boron hydride or the like, a source of air directed longitudinally of the combustion chamber for mixing with the high energy fuel, and an igniter for igniting the mixture of air and said fuel, fuel injection means located approximately centrally of said chamber and positioned in a direction transversely thereof, the fuel injection means comprising an injector, an inner shroud concentric to said injector and spaced slightly therefrom, said inner shroud having an aperture facing upstream of said air source for directing the air over and around said injector so as to draw the fuel outwardly of the injector and into the center of said combustion chamber, and an outer C-shaped shroud cooperating with said inner shroud to form a radiation shield, the open portion of said C-shaped shroud permitting the passage of air between said shrouds and over said fuel injector, said outer shroud forming an air passageway in cooperation with said inner shroud to break up the eddies formed by the inner shroud.

References Cited in the file of this patent

UNITED STATES PATENTS

| | | |
|---|---|---|
| 2,551,276 | McMahan | May 1, 1951 |
| 2,579,614 | Ray | Dec. 25, 1951 |
| 2,780,061 | Clarke et al. | Feb. 5, 1957 |

FOREIGN PATENTS

| | | |
|---|---|---|
| 694,483 | Great Britain | July 22, 1953 |
| 726,491 | Great Britain | Mar. 16, 1955 |
| 919,856 | Germany | Nov. 4, 1954 |